United States Patent

[11] 3,542,371

| | | |
|---|---|---|
| [72] | Inventor | **Takashi Saito** |
| | | **Tokyo, Japan** |
| [21] | Appl. No. | **741,447** |
| [22] | Filed | **July 1, 1968** |
| [45] | Patented | **Nov. 24, 1970** |
| [73] | Assignee | **Victor Company of Japan, Limited** |
| [32] | Priority | **June 30, 1967** |
| [33] | | **Japan** |
| [31] | | **No. 42/41,550** |

[54] COMBINATION PLAYER FOR DISCS AND TAPE-CARTRIDGES
1 Claim, 7 Drawing Figs.

[52] U.S. Cl. .......... 274/4, 274/9 179/100.1,

[51] Int. Cl. .......... G11b 5/00, G11b 25/04

[50] Field of Search .......... 274/1, 1.7, 2, 4, 9.1, 9, 10.1, 9.2, 15, 8; 242/55.13; 179/100.2Z, 100.1A, 100.11, 100.12

[56] References Cited

UNITED STATES PATENTS

| | | | |
|---|---|---|---|
| 2,029,730 | 2/1936 | Mallina | 179/100.1 |
| 2,466,124 | 4/1949 | Owens | 179/100.1 |
| 2,625,611 | 1/1953 | Roberts | 774/1 |
| 3,127,180 | 3/1964 | Lehmann | 274/15 |
| 3,307,851 | 3/1967 | Tourtellot | 274/15 |
| 3,400,227 | 9/1968 | Lear et al. | 179/100.2 |
| 2,521,476 | 9/1950 | Owens (II) | 274/8 |
| 2,706,637 | 4/1955 | Cain | 274/8 |

*Primary Examiner*—Harry N. Haroian
*Attorney*—Stevens, Davis, Miller & Mosher

ABSTRACT: A combination player for discs and tape-cartridges comprising a disc playback section for reproducing disc recordings, a tape playback section for reproducing tape recordings, common drive means, a disc playback operation change-over mechanism, and a switch mechanism operative in conjunction with insertion into or withdrawal of a tape cartridge from said tape playback section. When a disc recording is to be reproduced the disc playback operation change-over mechanism is actuated so as to transmit power from the drive means to the disc playback section, but when a tape recording is to be reproduced a tape-cartridge is inserted into the tape playback section and the switch mechanism is actuated so as to transmit power from the drive means to the tape playback section.

INVENTOR

TAKASHI SAITO

BY Stevens, Davis, Miller & Mosher

ATTORNEYS

INVENTOR
TAKASHI SAITO

INVENTOR
TAKASHI SAITO

BY Stevens, Davis, Miller & Mosher

ATTORNEYS

COMBINATION PLAYER FOR DISCS AND TAPE-CARTRIDGES

DISCLOSURE

The present invention relates to combination players for discs and tape cartridges, and in particular the invention is concerned with a combination player for discs and tape cartridges of the type which permits to transmit power from common drive means to a disc playback section or a tape playback section as desired by using switching means.

Media for recording and reproducing musical entertainment material now available include gramophone records or discs and magnetic tapes. The magnetic tape cartridge including a case that holds a recorded magnetic tape wound endlessly in a continuous loop has become increasingly popular in recent years and is now used as freely as gramophone records or discs in reproducing recorded music entertainment material.

It has hitherto been customary to use a record player for reproducing musical material recorded on a disc and a tape player for the playback of a magnetic tape, making it necessary to have two different kinds of players on hand. Stereophonic players in which the two kinds of players referred to above are built have been put on the market quite recently. They are constructed such that players are arranged independently in a single package with each player having drive means of its own. Their costs are naturally high, and moreover it is difficult to obtain a compact overall size in a stereophonic player.

The principal object of this invention is to provide a novel and useful combination player for discs and tape cartridges comprising a disc playback section and a tape playback section arranged in a single player unit, which obviates the aforementioned disadvantages of conventional equipment and which is compact in overall size, low in cost, and easy to operate.

Another object of the invention is to provide a combination player for discs and tape cartridges which comprises only one drive means for operating a disc playback section and a tape cartridge playback section independently.

A further object of the invention is to provide a combination player for discs and tape cartridges wherein the rotation of a turntable for playing a disc is reinforced by the rotation of a capstan flywheel of the tape playback section when music material recorded on a disc is reproduced, whereby irregular rotation of the turntable can be substantially eliminated or minimized.

Still another object of the invention is to provide a combination player for discs and tape cartridges wherein a mechanism for operating the disc player section is automatically released from association with the drive means when the playback of a disc recording is finished.

Yet another object of the invention is to provide a combination player for discs and tape cartridges wherein a mechanism for operating the tape playback section is operatively connected to or released from association with the drive means as a tape cartridge is inserted into or withdrawn from the tape playback section.

Other objects and advantages of this invention will become apparent from consideration of the following description when taken in conjunction with the accompanying drawings, in which.

In the drawings and the following description, like reference characters designate similar parts.

Figures 1, 3:
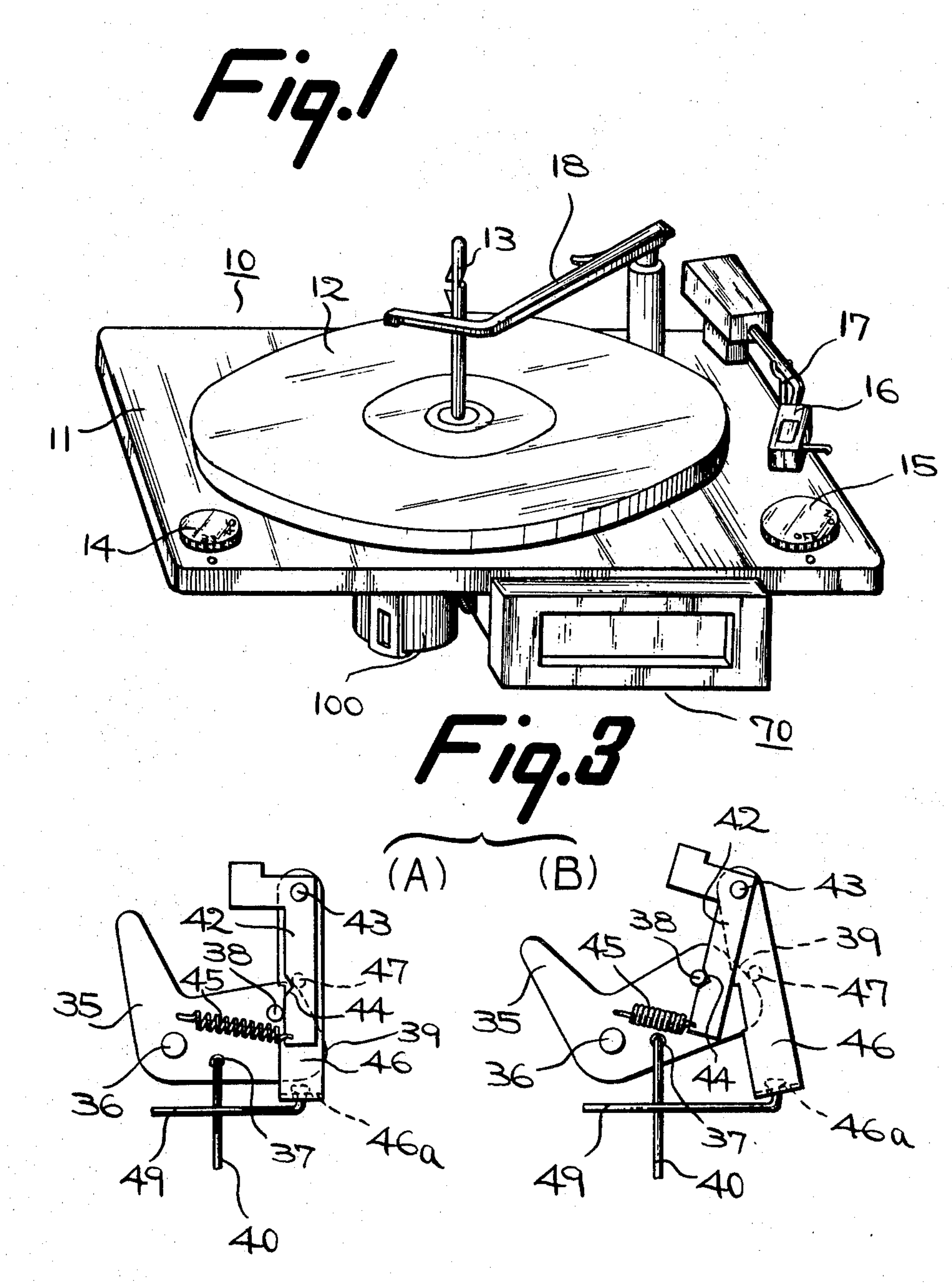
FIG. 1 is a perspective view of an embodiment of the combination player embodying the present invention.
FIG. 3 is a plan view of essential portions of a disc playback operation changeover mechanism in explanation of the manner in which switching of disc playback operations is effected, FIG. 3(A) showing the mechanism in a state when no disc is played and FIG. 3(B) showing the mechanism in a state when a disc is being played.

FIG. 1 shows an external appearance of the combination player embodying this invention, which consists of a disc playback section 10, a tape playback section 70 and drive means 100 commonly associated with the aforementioned two sections. The disc playback section 10 comprises a turntable 12 mounted above a motor board 11 for rotation with a disc resting thereon, a spindle 13 provided with a disc changer and disposed in the center of rotation of said turntable, a speed selection knob 14 for selecting one of several rates of revolution of the turntable as desired, a disc playback operation changeover knob 15 for switching the disc playback section from an Off or inoperative state to an On or operative state, a pickup 16, a rest 17 for firmly supporting said pickup, and a disc stabilizer 18. disposed below the motor board 11 is a mechanism for operating the disc playback section subsequently to be described.

The tape playback section 70 is disposed below the motor board 11 and formed at its front end with an opening or a slot for inserting a tape cartridge therethrough which is provided with a cover normally urged to close the opening. The tape playback section is provided with a mechanism for operating the tape playback section for reproducing tape recordings subsequently to be described.

The drive means or drive motor 100 commonly associated with the disc playback section and the tape playback section is also disposed below the motor board 11 and mounted for operation through the agency of a vibration absorbing member.

Figure 2:
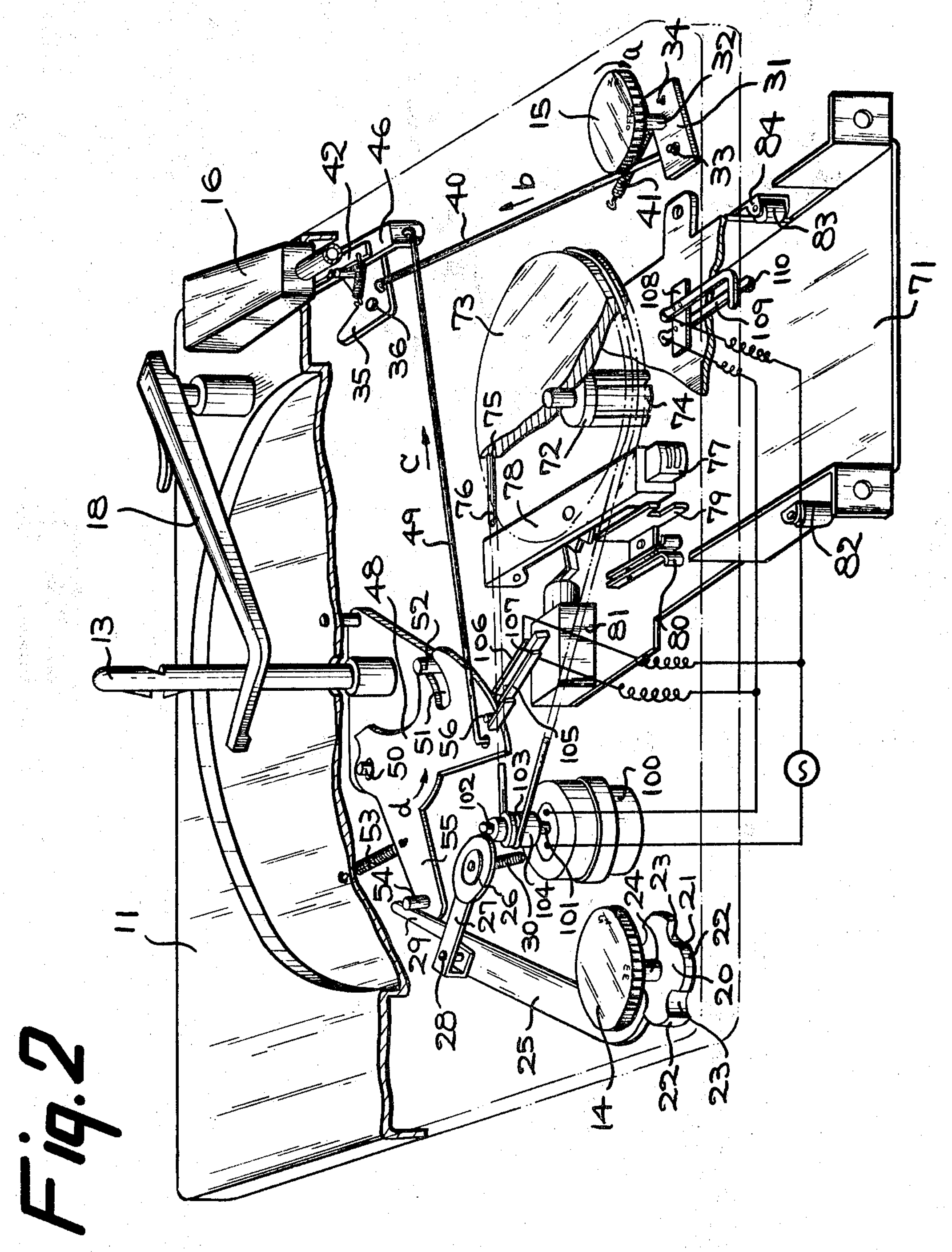
FIG. 2 is a perspective view, with certain parts being broken away, of a mechanism for operating the combination player shown in FIG. 1.

The construction and operation of mechanism for actuating the disc playback section 10 and the tape cartridge playback section 70 will now be described. As shown in FIG. 2, the drive motor 100 has a rotary shaft 101 to which is firmly secured a pulley 104 formed with a plurality of offset portions 102 in the upper part and a groove 103 for receiving therein a belt below said offset portions.

Disposed below the speed selection knob 14 and mounted coaxially therewith is a speed selection cam 20 which is formed with a beveled face 21 on its underside for determining the height of an idler, and convexed portions 22 and concaved portions 23 on its circumferential surface for moving the idler forwardly and backwardly. The speed selection knob 14 and cam 20 are mounted on a shaft 24 for rotation.

A first idler arm 25 is supported at one end for pivotal motion horizontally and sliding motion vertically, and has a contact portion normally urged into contact with the beveled underside 21 of the speed selection cam 20 and a stud maintained in contact with the circumferential surface of the speed selection cam 20. At the other end of the first idler arm 25, a second idler arm 27 rotatably supporting an idler 26 is rotatably mounted on a shaft 28 connected to the first idler arm 25. A lever 29 forms an extension of the idler arm 25 at said other end. Said idler 26 is normally urged by a spring 30 connected between the forward end of the second idler arm 27 and the motor board into contact with the outer circumferential surface of the pulley 104 and the inner side of the edge of the turntable 12.

Disposed below the disc playback operation changeover knob 15 coaxially therewith is a start lever 31 which is formed with two holes 33 and 34 disposed symmetrically with respect to a shaft 32 forming the center of rotation of the knob 15 and the lever 31.

A contact lever 35 formed with a hole 37, a stud 38 and a cam surface 39 is pivotally supported by a shaft 36. The contact lever has a shape as shown in FIGS. 2 and 3. A rod 40 connects the hole 37 of the contact lever and the hole 33 of the start lever 31. A spring 41 mounted between the other hole 34 of the start lever 31 and the motor board normally urges the knob 15 in the anticlockwise direction and the contact lever in the clockwise direction.

A key lever 42 is pivotally supported by a shaft 43 for contact with the stud 38 of the contact lever 35. A V-shaped notch 44 is formed substantially in the middle portion of the key lever on the side thereof on which the key lever is in contact with the stud 38. A spring 45 mounted between the forward end of the key lever 42 and the motor board normally urges the key lever 42 into contact with the stud 38 so as to lock the contact lever 35 against pivotal motion as subsequently to be described.

An arm 46 is disposed between the contact lever 35 and the key lever 42 and pivotally supported by the shaft 43. The contact lever, key lever and arm pivot in planes parallel to one another. Formed substantially in the middle portion of the arm 46 on the underside thereof is a roller stud 47 which is maintained in contact with the cam surface 39 of the contact lever 35. The arm 46 is formed at its forward end with a bent portion 46*a* bent downwardly at right angles to the arm. A second rod 49 connects said bent portion 46*a* and a switch lever 48 presently to be described.

The switch lever 48 is pivotally supported by a shaft 50 and guided by an arcuate slit 51 formed therein and a guide pin 52 for pivotal motion in conjunction with reciprocating motion of the second rod 49. A spring 53 mounted between the switch lever and the motor board normally urges the switch lever in the clockwise direction. The spring 53 also urges, through the agency of the second rod 49, the roller stud 47 of the arm 46 into contact with the cam surface 39 of the contact lever. The switch lever 48 has an arm portion 55 on which is mounted a stud 54 adapted to engage the lever 29 of the first idler arm 25. The switch lever operates such that it normally urges the idler 26 away from the pulley 104 and the turntable 12 and prevents the former from coming into contact with the latter.

Another stud 56 on the switch lever 48 is in engagement with a movable contact member 105 of a power source switch 107 connected to a power source circuit of the drive motor 100, said power source switch 107 further including another contact member 106. The two contact members 105 and 106 are normally out of contact with each other and the power source switch is opened.

The automatic stop mechanism actuated upon completion of the playback of a disc recording operates in the manner described hereunder. Upon unlocking of the contact lever 35 from engagement with the V-shaped notch 44 of the key lever 42, the power source switch 107 of the drive motor 100 is opened, and at the same time the idler 26 is released from engagement with the pulley 104 and the turntable 12, with the disc playback operation changeover knob 15 being returned to an Off position. This unlocking mechanism will now be explained with reference to FIG. 4. The mechanism of operation in which the playback of a disc recording is automatically stopped each time reproduction of recorded material on one side of a disc is finished will first be explained. An arm portion 42*b* of the key lever 42 is brought into engagement with a forward end 57*a* of a pusher 57 which is connected by a shutoff rod 60 to one end of a shutoff lever 59 pivotally supported substantially at its middle portion by a shaft 58. The other end of the shutoff lever 59 is at all times in contact with the outer circumferential surface of a cam 61 formed with a convexed portion 61*a*. The cam 61 makes a complete turn when the playback of a disc recording is finished at the same time as a well known automatic pickup return mechanism is actuated.

For example, the cam 61 may be mounted on the center shaft of the cam gear 19 shown in our copending U.S. Pat. application Ser. No. 550,375 filed on May 16, 1966, now U.S. Pat. No. 3,433,486.

The mechanism of operation in which a disc changer is employed will now be explained. In cases where a disc changer is employed, it is required that the automatic stop mechanism be put into action only after a plurality of disc recordings have been reproduced continuously and all the performance has been completed. This makes it necessary to use additional elements in addition to those described hereinabove.

A shaft 62 supporting the disc stabilizer 18 mounts at its lower portion a stud 63 which is in engagement with a first lever 65 normally urged by a spring 64 in the clockwise direction. The first lever 65 is connected to a second lever 66 by a connecting rod 67 and the two levers are pivotally supported by the rod 67. The second lever 66 mounts at its forward end 66*a* a pin 68 which is in engagement with a slit 57*b* formed in the pusher 57. The pusher 57 and the shutoff rod 60 are pivotally supported, and the forward end 57*a* of the pusher is not normally in engagement with the arm portion 42*b* of the key lever 42.

Figures 4, 5:
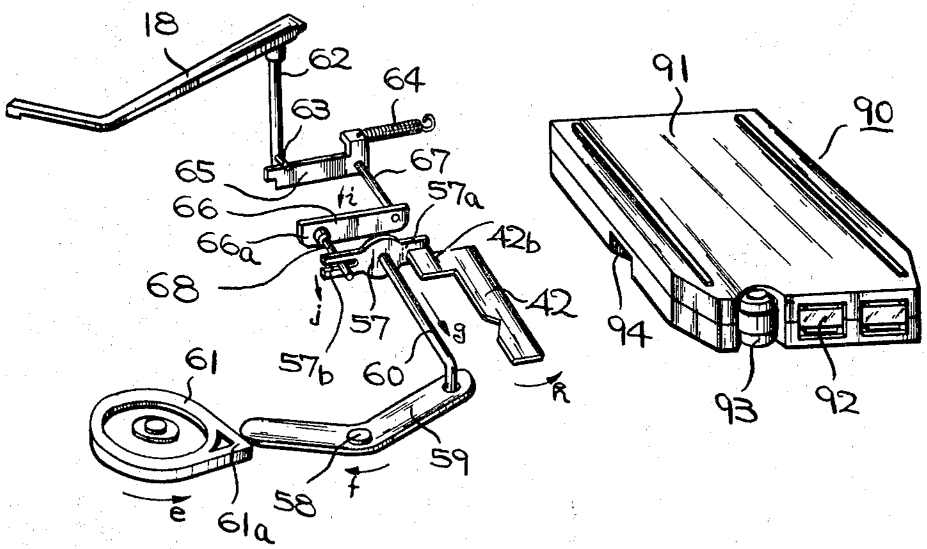
FIG. 4 is a schematic perspective view of an automatic stop mechanism actuated when the playback of a disc recording is finished.
FIG. 5 is a perspective view of a tape cartridge adapted for use with the tape playback section of this embodiment.

The tape playback section 70 will now be explained with reference to FIG. 2. 71 refers to a tape deck formed below the motor board 11 for receiving thereon a tape cartridge 90 (See FIG. 5). Disposed inwardly of the tape deck is a capstan shaft 74 supported in a bearing 72 having a cutout portion and having a flywheel 73 firmly secured to its upper portion. A belt 76 is trained between a groove 75 formed on the outer circumferential surface of the flywheel 73 and the groove 103 formed in the offset pulley 104 firmly secured to the rotary shaft 101 of the drive motor 100. The flywheel 73 has a larger diameter than the offset pulley 104, for example the former has a diameter of 68 millimeters and the latter 20 millimeters, so that the rate of revolution of the flywheel is lower than that of the drive motor 100.

77 refers to a magnetic head which is supported by a holder 78 for up and down motion so as to effect switching of tracks. 79 designates a tape guide, 80 a sensor, and 81 an electromagnetic solenoid serving as a power source for moving the magnetic head 77 up and down. A power source switch 108 connected to the power source circuit of the drive motor 100 and normally open has a movable contact member 109 which is mounted in such a manner as to extend through the upper opening of the tape deck 71 into the deck. The power source switch 108 is connected in shunt with the power source switch 107 of the disc playback section 10. A boss 110 is mounted on the movable contact member 109 of the switch 108.

82 designates a guide roller for guiding a tape cartridge 90 when the latter is inserted into the tape deck 71. 83 is a pressing roller which is received in a V-shaped notch 94 of the tape cartridge 90 for holding the tape cartridge in place on the tape deck 71 and at the same time pressing a tape 92 against the magnetic head 77 and the capstan shaft 74 with a suitable force. FIG. 5 shows a tape cartridge adapted to be inserted in the player described above, which includes a plastic case 91 that holds a magnetic tape 92 wound endlessly in a continuous loop. The magnetic tape can be seen through a window formed on the forward end of the plastic case 91. 93 designates a built-in pinch roller, and 94 a V-shaped notch formed on a lateral side of the cartridge.

Figure 6:
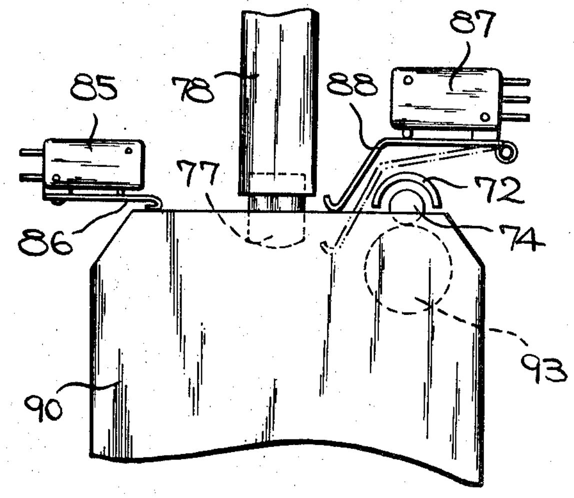
FIG. 6 is a plan view of the other example of a switch mechanism for the tape playback section.
Figure 7:
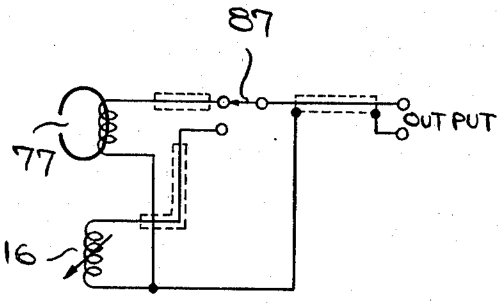
FIG. 7 is a connection diagram of the portion for switching between two reproducing means as shown in FIG. 6.

FIG. 6 shows the other example of the switch mechanism for the tape playback section. 85 refers to a microswitch which functions as a power source switch of the drive motor 100 and possesses a first actuator 86 oscillatable upon insertion or withdrawal of the tape cartridge to open or close said microswitch 85. 87 refers to a two-step changeover microswitch which possesses a second actuator 88 oscillatable upon insertion or withdrawal of the tape cartridge for actuating the switch 87. The switch 87 functions in such a manner that when no tape cartridge is in the player the pickup circuit is connected to the amplifier circuit, and when a tape cartridge is in the player the magnetic head is connected to the amplifier circuit. FIG. 7 shows a connection diagram showing a portion of the switch mechanism described above.

The operation of various mechanisms described above will now be explained. The operation of a mechanism for reproducing a disc recording will first be explained with reference to FIGS. 2 and 3. The speed selection knob 14 is turned to select a rate of revolution as desired. The height of the idler 26 is set at the level of the desired offset portion on the pulley 104 by the cam 20, first idler arm 25 and second idler arm 27 similarly as the conventional switch over mechanism for playing 45 or 33 r.p.m. record disk. However, the idler 26 is restrained by the switch lever 48 from pressing against the pulley 104 and the turntable 12. Then the disc playback changeover operation knob 15 is turned in the clockwise direction as shown by the arrow *a* to an On position. This causes the start lever 31 to rotate in the clockwise direction against the biasing force of the spring 41. This results in the first rod 40 moving in the direction of arrow *b* and the contact lever 35 moving in pivotal motion in the anticlockwise direction. Accordingly, the stud 38 of the contact lever 35 is received in the V-shaped notch 44 of the key lever 42 so as to lock the contact lever 35 and the disc playback operation changeover knob 15 in their respective positions. At the same time, the arm 46 pivotally supported by the shaft 43 is caused by the roller stud 47 and the cam surface 39 of the contact lever 35 to move in pivotal motion in the anticlockwise direction. This results in the second rod 49 moving in the direction of arrow *c* and the switch lever 48 moving in pivotal motion in the direction of arrow *d*. This pivotal motion of the switch lever 48 releases the idler 26 from the influence of the switch lever and the idler 26 is caused by the biasing force of the spring 30 to press against the pulley 104 and the turntable 12, so that rotation of the drive motor can be transmitted to the turntable. At the same time, the movable contact member 105 of the power source switch 107 for the drive motor 100 and the other contact member 106 are brought into contact with each other so as to permit the drive motor 100 to start rotating. The turntable is thus rotated at a desired rate of revolution for reproducing a disc recording. It should be noted that as the turntable rotates the flywheel mounted on the capstan shaft of the tape playback section also rotates, so that flywheel effect is imparted to the turntable and irregular rotation of the turntable is substantially eliminated or minimized.

The operation of automatic stop mechanism after completion of the playback of a disc recording will be explained with reference to FIG. 4. When automatic stop of operation is to be effected each time the performance of one side of the disc is finished, the arm portion **42*b* of the key lever 42 is in engagement with the forward end 57*a* of the pusher 57. As the cam 61** is rotated in the direction of arrow *e* by the pickup return mechanism and causes the shutoff lever 59 to move in pivotal motion in the direction of arrow *f* by its convexed portion **61*a* upon completion of performance, the push rod 60** is moved in the direction of arrow *g* and the pusher 57 also moves in the direction of arrow *g*, with the result that the key lever 42 moves in pivotal motion in the direction of arrow *h*. This releases the V-shaped notch 44 of the key lever 42 from engagement with the stud 38 of the contact lever 35, thereby permitting the contact lever 35, second rod 49, switch lever 48, first rod 40, start lever 31 and disc playback operation changeover knob 15 to move in reciprocating or pivoting motion in directions opposite to the directions of their movement in starting performance. Accordingly, the power source switch 107 is opened and the idler 26 is released from engagement with the turntable 12, which stops rotating.

The operation of automatic stop mechanism when a record changer is used will now be explained. A plurality of discs are generally stacked and held by the spindle 13 and the record stabilizer 18 rests on the upper surface of the uppermost disc. At this time, the key lever 42 is not in engagement with the pusher 57. When the last disc held by the spindle 13 drops onto the turntable, the disc stabilizer 18 drops by its own weight and causes, through the agency of the stud 63 of the disc support shaft 62, the first lever 65, connecting rod 67 and second lever 66 to move in pivotal motion in the direction of arrow *i*. This causes, through the agency of the pin 68 of the second lever 66, the pusher 57 to move in pivotal motion in the direction of arrow *j*, bringing the forward end **57*a* of the pusher into engagement with the arm portion 42*b* of the key lever 42 (FIG. 4 shows the two members in engagement with each other). Upon completion of performance, the cam 61 makes one complete revolution as aforementioned and causes, through the agency of the shutoff lever 59, shut off rod 60 and pusher, the key lever 42** to move in pivotal motion in the direction of arrow *h*. This releases the V-shaped notch 44 of the key lever 42 from engagement with the stud 38 of the contact lever 35. Thereafter, the same process as described above is repeated and the turntable stops rotating.

The invention will now be explained with reference to the operation of the player with reference to the playback of a tape recording. Upon insertion of a tape cartridge 90 as illustrated in FIG. 5 through the cartridge insertion port into the tape playerback section 70 and moving same inwardly along the tape deck 71 till the V-shaped notch 94 of the tape cartridge 90 is brought into engagement with the plate spring-loaded pressing roller 83 of the tape playback section, the movable contact member 109 of the power source switch for the drive motor 100 is pressed against the upper surface of the tape cartridge 90 and the power source switch 108 is closed. This causes the drive motor 100 to rotate, which in turn causes, through the agency of the pulley 104, belt 76 and flywheel 73, the capstan shaft 74 to rotate. The magnetic tape held between the capstan shaft and the built-in pinch roller 93 begins to move and recorded material on the tape is reproduced by the magnetic head 77.

Upon withdrawal of the tape cartridge 90 from the tape playback section after the performance is completed or during the performance is progressing, the movable contact member 109 pressing against the upper surface of the tape cartridge is returned to its original position, thereby opening the power source switch 108. Accordingly, the drive motor 100 stops rotating and the capstan shaft 74 simultaneously stops rotating. The power source switch may be in the form of a microswitch 85 opened or closed by the actuator 86 oscillatable upon contacting the front surface of the tape cartridge 90 as shown in FIG. 6. The reproducing means or the magnetic head and the pickup may be so arranged that they are switched and connected independently to the amplifier circuit as shown in FIGS. 6 and 7. This arrangement is conducive to shutting out noises generated in the counterpart means.

It should be understood that the specific preferred embodiment and practices which have been depicted and described herein have been presented by way of disclosure rather than limitation, and that those skilled in the art will appreciate that various modifications, combinations and substitutions may be effected without departure from the spirit and scope of this invention in its broader aspects.

I claim:

1. A combination player for disks and tape cartridges consisting of a disk playback section, a tape playback section, and a motor,
   - said disk playback section comprising a pickup a turntable adapted for rotation with a disk resting thereon, means for transmitting the rotating power of the motor to said turntable, and operation changeover means for switching the disk playback section from an inoperative state to an operative state,
   - said tape playback section comprising holding means for holding a tape cartridge having a magnetic tape wound in a continuous loop and a built-in pinch roller therein which is inserted through a slot provided in the playback section, a magnetic head adapted to come into contact with the magnetic tape when the tape cartridge is inserted and held by said holding means, a capstan adapted to press the magnetic tape against the pinch roller when the tape cartridge is inserted and held by said holding means,
   - a flywheel concentrically fixed to said capstan, means for transmitting the rotating power of the motor to said flywheel, and means for respectively opening and closing a power source for driving the motor which is adapted to be actuated upon respective insertion or withdrawal of the tape cartridge, and wherein said operation changeover means comprises a contact lever pivotally supported by a first shaft and formed with a first stud and a cam surface; a key lever pivotally supported by a second shaft and formed with a notch on a side thereof; first spring means for urging said side of the key lever into contact with said first stud; an arm member having a second stud, disposed between the contact lever and the key lever and pivotally supported by a second shaft at one end thereof; a switch lever having third and fourth studs and pivotally supported by a third shaft; a connecting member connected between the other end of the arm member and the switch lever; second spring means for urging the second stud into contact with the cam surface by way of the connecting member; moving means for reversibly moving the contact lever about the first shaft so that the first stud is in and out of contact with said notch; a switch through which the power source is connected to the motor, having a movable contact member contacted with said third stud and a fixed contact member adapted to be out of contact with said movable contact member when the first stud is out of contact with said notch and to be in contact with said movable contact member when the first stud is in contact with said notch by the moving means; and means for respectively engaging and disengaging the means for transmitting the rotating power of the motor to said turntable, depending upon whether the first stud contacts with said notch or not, through the movement of the fourth study by the moving means.